United States Patent
Strasser

[19]
[11] Patent Number: 6,105,457
[45] Date of Patent: Aug. 22, 2000

[54] SELF-ADJUSTING DEVICE THAT EQUALIZES LENGTH

[75] Inventor: Dieter Strasser, Stadthägen, Germany

[73] Assignee: Bertrand Faure Sitztechnik GmbH & Co. KG, Stadthagen, Germany

[21] Appl. No.: 09/327,673

[22] Filed: Jun. 8, 1999

[30] Foreign Application Priority Data

Jun. 10, 1998 [DE] Germany ............................. 198 25 834

[51] Int. Cl.$^7$ ...................................................... F16C 1/22
[52] U.S. Cl. .................................. 74/501.5 R; 74/501.6; 297/354.1
[58] Field of Search ........................... 74/501.5 R, 501.6, 74/502.2; 254/272, 392; 297/354.1

[56] References Cited

U.S. PATENT DOCUMENTS

| | | | |
|---|---|---|---|
| 2,423,483 | 7/1947 | Clark | 74/501.5 R |
| 3,305,220 | 2/1967 | Nevulis | 74/501.5 R X |
| 3,365,978 | 1/1968 | Kirby et al. | |
| 4,448,090 | 5/1984 | Carré et al. | |
| 4,693,137 | 9/1987 | Deligny | 74/601.5 R |

*Primary Examiner*—Richard M. Lorence
*Attorney, Agent, or Firm*—Pollock, Vande Sande & Amernick, R.L.L.P.

[57] ABSTRACT

The invention pertains to a self-adjusting device that equalizes the length for pull ropes which activate parts of motor vehicles, particularly for locking latches of motor vehicle seats, with a spring-loaded tension element. The spring-loaded tension element is formed by a pivoting lever which is guided on a support, so that its longitudinal position may be shifted and so as to be capable of being pivoted, which exhibits two terminal areas that are entwined by the pull rope. Due to the use of a tension spring, one terminal area abuts a stop, from which it may be lifted up as the force of the tension spring is overcome, and swiveled to make contact with an opposing stop, when tractile force is applied to the pull rope. The stop and opposing stop exhibit contact surfaces that run parallel to one another, and which extend across the pathway of longitudinal shift. Between the two entwined terminal areas of the pivoting lever, provision is made for an area of entwinement in a fixed location on the support.

6 Claims, 4 Drawing Sheets

SELF-ADJUSTING DEVICE THAT EQUALIZES LENGTH

BACKGROUND OF THE INVENTION

The invention relates to a self-adjusting device that equalizes length.

Self-adjusting devices that equalize length are known in various embodiments. Thus, there are spring-loaded tension rollers that keep a traction rope taut. With tension rollers of that type, however, neither an equalization of differing rope lengths due to production tolerances, nor a lasting extension of rope which occurs with use over a period of time, can be compensated. This is particularly problematical in the case of traction ropes for the activation of locking latches on seats in motor vehicles. Due to the fact that such locking latches are customarily provided on two different sides of the folding back rest, they must be adjusted and synchronized very precisely. Doing so is time-consuming. In addition, unequal changes in the length of the traction ropes that lead to different locking latches, changes which are altogether possible, have the disadvantageous consequence that after a period of use, the two locking levers no longer release the locking bolts on the seat parts simultaneously. In addition, as a result of changes in the length of the traction rope, the initial position of the activation lever is changed, with the consequence that in the extreme case, the remainder of the path of position adjustment of the activation element is no longer sufficient to release the locking latch.

A device for equalizing length, which joins adjacent ends of a tractile element, such as a pull wire or a traction rope, is already known from for example, U.S. Pat. No. 4,448,090. In such device one end is connected to a terminal element that assumes the form of a pin and is under pre-stress in the direction of its axis by means of a compression spring; the other end is connected with a yoke, on which a clamping rocker that is under pre-stress by means of a spring is seated so that it can pivot. Under the force of the spring, the clamping rocker is held snugly, with its clamping surface against the outer circumference of the terminal element, which is in the form of a pin. A critical disadvantage of this known length-equalizing device resides in the fact that it may not be used for continuous pull ropes, but only for discontinuous ones.

An adjustment device is known, furthermore, (U.S. Pat. No. 3,365,978) in which two areas of a tightening element that may be swiveled are partially entwined by a continuous pull ropes. This adjustment device serves neither as a device that equalizes the length of pull ropes, nor is it automatically self-adjusting. Rather, the tension element, which may be pivoted, serves to generate a pre-selected position of a tool that is to be operated.

It is an object of the invention to create a self-adjusting device that equalizes length for a continuous pull rope that operates parts of motor vehicles, and in particular, for locking latches of motor vehicle seats, by means of which the initial position of the activation element is kept constant, so that apparatus that equalizes length may be constructed in a simple and cost-effective manner.

SUMMARY OF THE INVENTION

The invention resolves the deficiencies in the prior art described above to by virtue of the fact that a rope-tightening mechanism is structurally incorporated into a pull rope, in series. The rope-tightening mechanism is embodied in such a way that it can compensate for elongations of rope without shifting the course the rope follows.

The length-equalizing device according to the invention assures that the effective length of the rope is kept constant at all times. Thus, the activation lever for the purpose of unlocking does not change position in the case of use-related rope elongation. Production-related tolerances of the pull rope lengths are equalized as well, so that costly adjustment tasks are eliminated.

The length-equalizing device is constructed in such a manner that every time the pull rope is activated, prior to the transfer of tractile forces, a path is initially traveled which is generated as a result of the shift of the position of the pivoting lever from the stop to the opposing stop; however, this pathway remains identical in every state of pull rope. Accordingly, the same position-shifting processes result at all times.

DETAILED DESCRIPTION OF THE PREFERRED EMBODIMENTS

Figure 1:
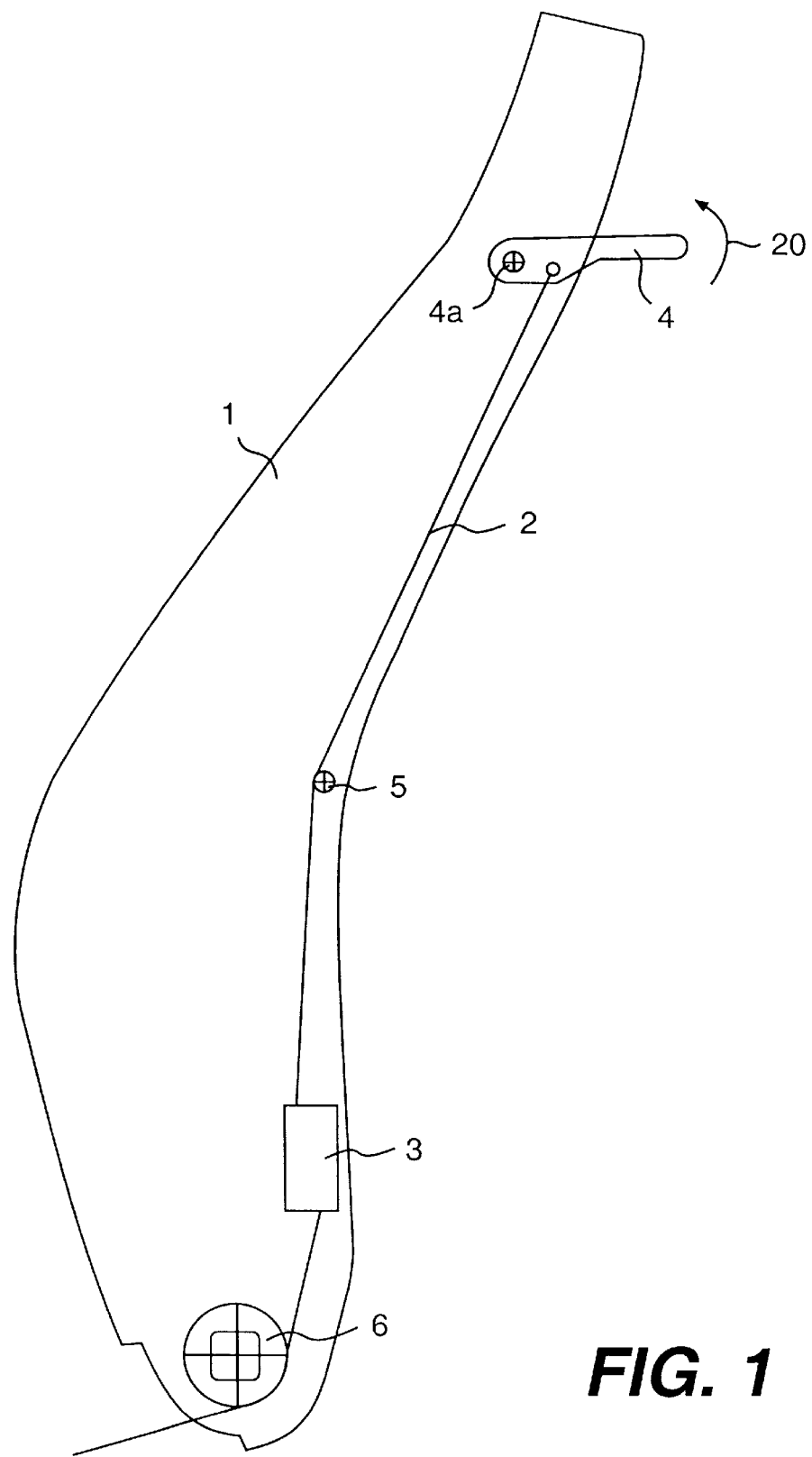
FIG. 1 shows the back rest of a motor vehicle's seat with the pathway of the rope for the activation of the locking latch by means of which the back rest is locked to the seat portion, with a representation of the point of installation of the device that equalizes length.

As shown in FIG. 1, on the back rest 1 of a motor vehicle seat, a pull rope 2 leads from an activation lever 4 to a locking latch that is not depicted. The activation lever 4 can pivot around an axis 4a that is fixed relative to the back rest. The pull rope 2 is guided by means of a deflection bolt 5 and a deflection roller 6. Between activation lever 4 and the locking latch, a device 3 that equalizes length is set into the pull rope 2.

Figure 2:
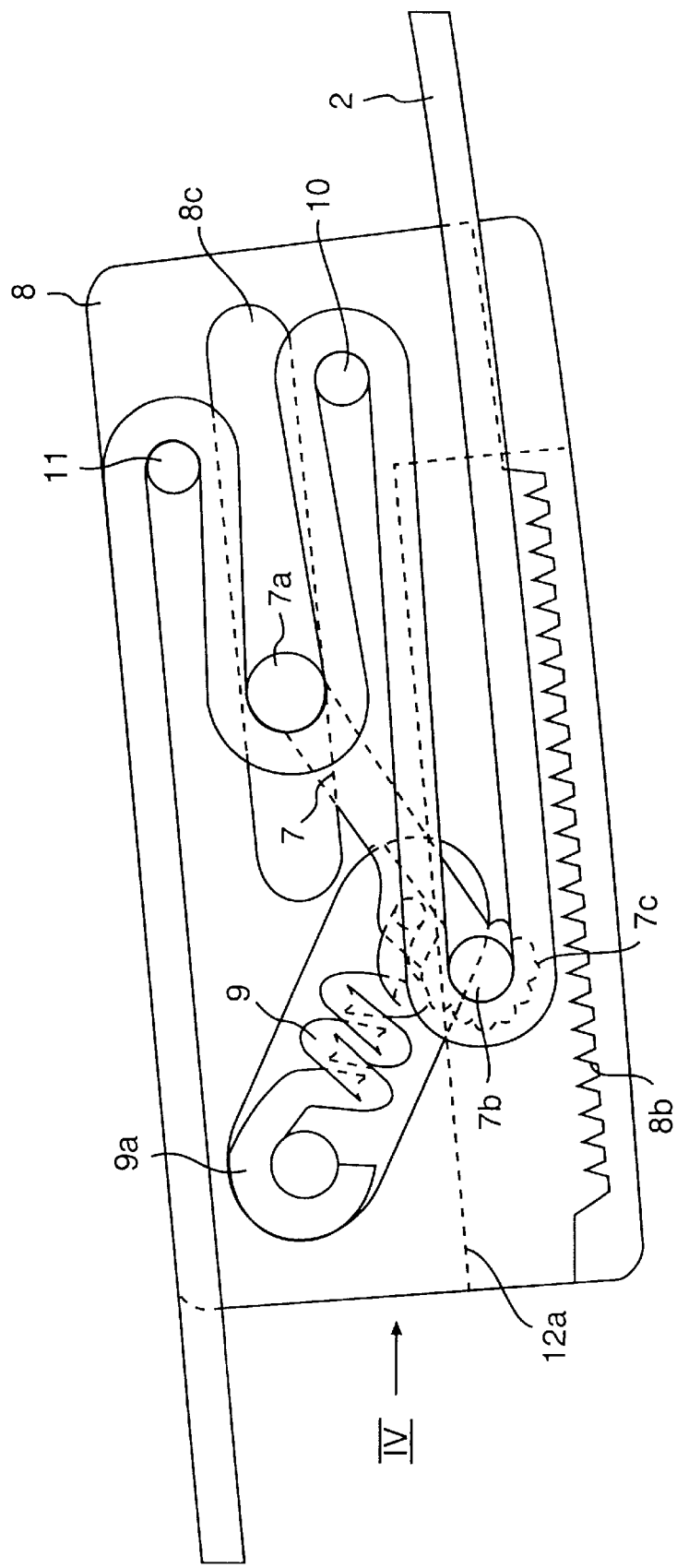
FIG. 2 shows a view of the device that equalizes length, when the traction rope is not pulled taut.

The device that equalizes length 3 which is shown in detail in FIG. 2, has a support 8 with a longitudinal groove 8c in which a pivoting lever 7, having a terminal area 7a, is guided so that its longitudinal position may be shifted. The terminal area 7a is embodied as a bolt that is entwined by pull rope 2. The opposite terminal area 7b of pivoting lever 7 is, likewise, entwined by the pull rope 2. The terminal area 7b has a laterally arranged catching surface 7c which is formed of a gear-toothed area. On the support 8, parallel to the longitudinal groove 8c, an opposing stop 8b is provided, which has a gear-toothed catching surface. A draw spring 9 which is attached by means of its spring eyelet 9a to support 8 works upon the pivoting lever 7. In addition, two diversion points, 10, 11 for the pull rope 2 are provided on the support 8 in such a way that two bights lie opposite the bights of pull rope 2 that entwine the terminal areas 7a, 7b of the pivoting lever 7. In FIG. 2, in addition, a stop 12a for terminal area 7b of pivoting lever 7 is indicated, which is provided, in the embodied example, in the cover 12 of support 8, which is not depicted here. Stop 12a extends parallel to catching surface 8b.

The pull rope 2 that comes from activation lever 4 entwines the terminal area 7b of the pivoting lever 7, then extends to diversion point 10 and is led back to the second terminal zone 7a of pivoting lever 7, which it also entwines.

From here, the pull rope 2 runs around the diversion area 11 which is fixed on the support out from the length-equalizing device 3 to the part of the motor vehicle. The entry and egress of the pull rope 2 on opposing sides of the support 8 yields the result that the support 8 need not be attached to the seat of the motor vehicle, but rather, is held by the pull rope 2 itself.

The device 3 which equalizes the length is depicted in FIG. 2 in a state in which the activation lever 4 is in its initial position. The pull rope is pulled taut by tension spring 9, so that neither the activation lever 4 nor the other elements that are connected with pull rope 2 can rattle. As a result of entwining both terminal areas 7a and 7b, which may be shifted longitudinally, the pull rope 2 can be kept taut even in the case of considerable differences in length.

Figure 3:
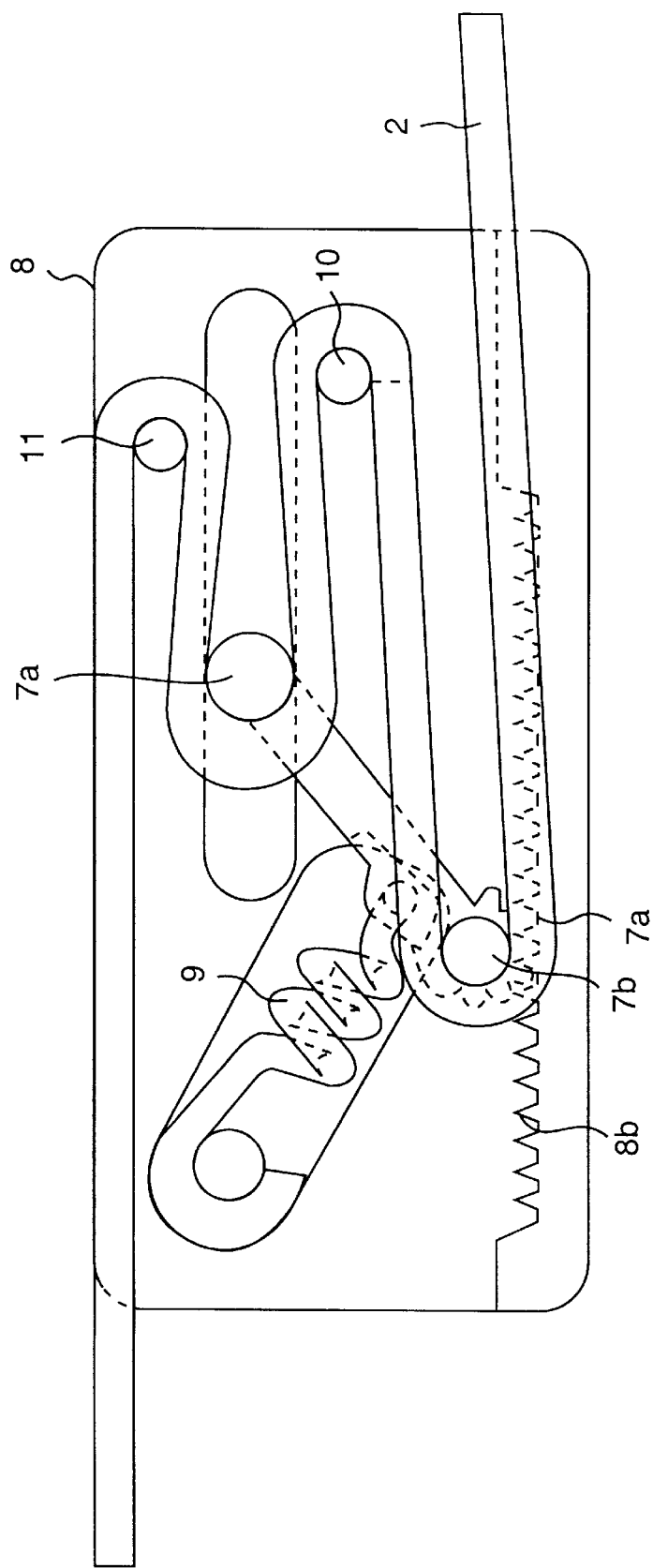
FIG. 3 shows a view that is analogous to FIG. 2, with the traction rope pulled taut.

If the activation lever 4 is rotated in the direction of the arrow 20 which is shown in FIG. 1, the resulting state of the device 3 that equalizes length is depicted in FIG. 3. As a result of an initial, brief force applied to the activation lever 4 along a fixed path, pivoting lever 7 pivots from stop 12a to catching surface 8b. In this way, a shift in the position of pivoting lever 7 is prevented, so that the further activation of the activation lever 4 leads to a free swiveling of the locking latch, which is not depicted. Compensation for the lengthening of the rope is obtained by means of the initial position of pivoting lever 7, which migrates in the course of the duration of the operation.

Figure 4:
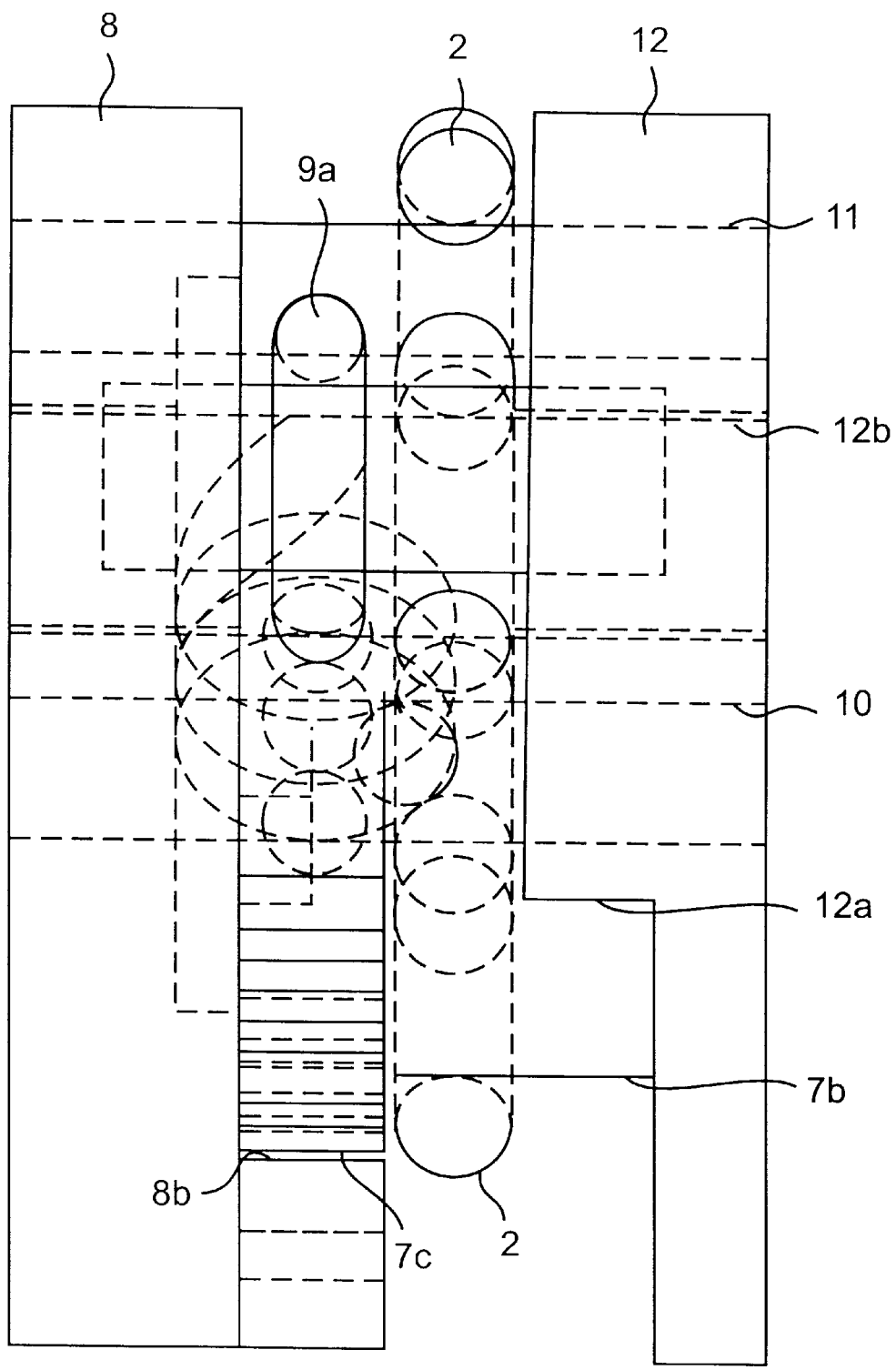
FIG. 4 shows a view of the device that equalizes length, in the direction of the arrow IV according to FIG. 2.

From FIG. 4, it is possible to see that support 8 is embodied as a housing that is closed by the cover 12. Stop 12a is found in the cover 12, whereas its opposite stop, number 8b, is provided in support 8. The points of diversion, 10, 11, are formed by shafts that are positioned between support 8 and cover 12 so as to be capable of rotation. To improve the guidance of pivoting lever 7, a longitudinal groove, 12b, is provided in the cover 12, which corresponds to the longitudinal groove, 8c, of support 8 and lies opposite the latter. The compact and light housing can be accommodated simply and without particular attachment in the back rests I of automobile seats.

What is claimed is:

1. A self-adjusting device for equalizing length in a pull rope used for activating parts of motor vehicles, having a spring-loaded tensioning element comprising a pivoting lever guided on a support and adapted to be shifted longitudinally and pivoted, said pivoting lever further having first and second terminal areas entwined by said pull rope, wherein:

said first terminal area is held by a tension spring in a first position abutting a first stop; and when a tractile force is applied to said pull rope to overcome the force of said tension spring, said pivoting lever pivots to bring said first terminal area into a second position abutting a second stop;

said first and second stops having contact surfaces parallel to one another and extending across a path of longitudinal displacement; and said first and second terminal areas having a stationary area of entwinement therebetween.

2. The self-adjusting device according to claim 1, wherein the contact surface of said second stop has a catching surface that is not smooth, and said first terminal area has a catching surface that is not smooth.

3. The self-adjusting device according to claim 2, wherein the catching surfaces have gear toothing.

4. The self-adjusting device according to claim 1, wherein the support is a housing.

5. The self-adjusting device according to claim 1, wherein said second terminal area, when longitudinally shifted, is guided in a longitudinal support groove which runs parallel to the contact surfaces of said first and second stops.

6. A self-adjusting device according to claim 1, wherein said second terminal area is entwined by a section of the pull rope that is diverted in a first direction by a first stationary diversion point and in a second direction parallel to the first direction by a second diversion point, said first and second diversion points being provided laterally on the support.

* * * * *